June 10, 1969  P. A. COURTOT  3,448,922
THERMOSTATICALLY CONTROLLED GOVERNOR VALVES
Filed Oct. 31, 1966  Sheet 1 of 4

United States Patent Office 3,448,922
Patented June 10, 1969

3,448,922
THERMOSTATICALLY CONTROLLED GOVERNOR VALVES
Pierre Albert Courtot, Marnes-la-Coquette, France, assignor to Centre Technique des Industries de La Fonderie, Paris, France, a public utility institute of France
Filed Oct. 31, 1966, Ser. No. 590,636
Claims priority, application France, Nov. 4, 1965, 37,319; Sept. 30, 1966, 78,377
Int. Cl. G05d 23/20, 23/12
U.S. Cl. 236—93                                        11 Claims

ABSTRACT OF THE DISCLOSURE

A governor valve for the cooling fluid of a forming mold which controls the output of the fluid as a function of the temperature of the fluid having a variable closure member located in a main passage which connects an upper and a lower chamber. The closure member is connected to a thermostatic control bellows which is in thermal connection with the fluid flowing in one of the chambers and a biasing member acts against the bellows. The biasing member is adjustable and an auxiliary passage having means for adjusting the diameter thereof connects the upper and lower chambers to by-pass the passage and places the upper and lower chambers in permanent communication with one another.

---

Figure 1:
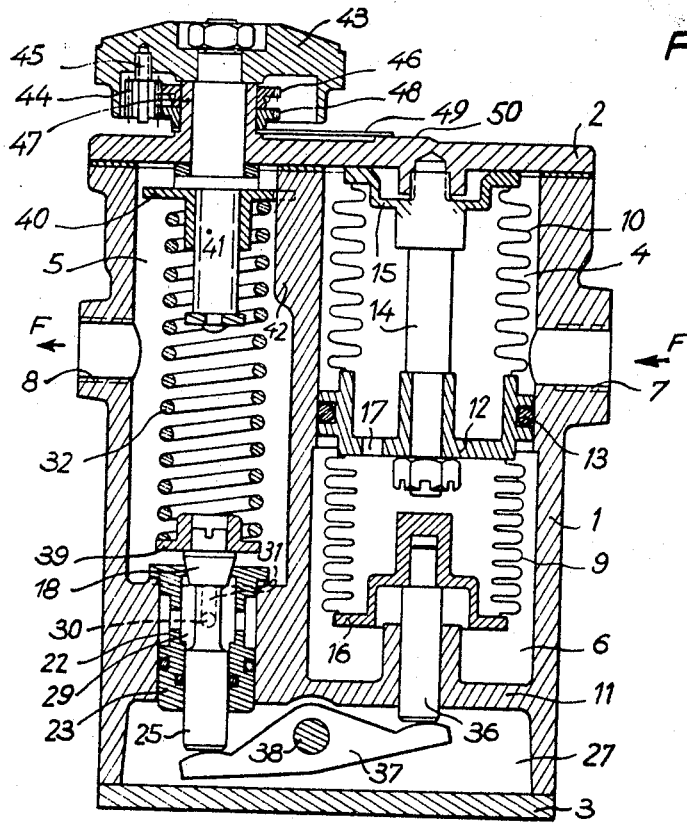

The present invention relates to governor valves for controlling the output of a fluid independent of its temperature.

The conventional type of governor valve bearing the greatest similarity to the present invention comprises a valve which controls the connection between an upper and a lower chamber connected in series to the liquid circuit. The valve is connected to thermostatic bellows located in the upper chamber and connected to a thermoprobe arranged at another point within the said circuit, the thermostatic bellows and the thermoprobe being filled with an expansible fluid. The valve is also connected to a piezometric compensating bellows and a compensating spring, both of which are located in the lower chamber.

One disadvantage of such a conrtol arrangement lies in the fact that it is often a very difficult matter to locate the thermoprobe in the most suitable position due to its fairly considerable bulk. This difficulty is increased if the part in which the probe is to be located is movable or liable to be frequently dismantled or replaced. Furthermore, the probe is an accessory which does not form an integral part of the control arrangement and may, therefore, increase the difficulty of mounting the arrangement in the circuit, and the time required therefor, and also lead to disturbances in the operation of the arrangement such as leakages of the fluid, the output of which is to be controlled in dependence upon its temperature, leakages of the thermostatic fluid, blockage of the connection between the probe and the bellows, etc.

A further disadvantage of this conventional governor valve arrangement is that the location of the thermostatic bellows makes it sensitive to variations in both temperature and pressure, in spite of the provision of the piezometric compensating bellows.

Finally, the actual design of the governor valve described means that it may only be used for gas-heated water-heaters in which the preset temperature of the water leaving the heater is controlled by means of a Venturi tube arrangement known in the art. However, use of this governor valve arrangement has now been discontinued even in this very specialised application.

In any case the conventional governor valve arrangement described is not suitable for use either where it is impossible to locate a probe in position or where control has to be effected without delay and only in dependence upon the temperature of the fluid. This is the case, for example, of systems for regulating the flow of coolant liquid for metal casting moulds.

In this connection it should be made quite clear that the industrial applications of thermal control systems are many and varied. In conventional practice it is ofen necessary to maintain at a certain normal working temperature components or sets of components, whether stationary or movable, which, when in service, are continuously subjected to the effect of high temperatures brought about by an external heat source. In the case of metal casting moulds this heat source is the molten metal poured into the moulds. Thus, in order to make this possible it is necessary to cool the moulds in order to avoid their being overheated to temperatures which would lower their efficiency and to maintain them at optimum working temperature.

A convenient method consists in using a suitable device to apply, to a greater or lesser surface of these parts, a jet of coolant fluid which is generally a liquid and which absorbs and dissipates the heat to an extent depending upon the amount of coolant ejected. The amount of fluid ejected thus has to be regulated so that it is a function of the temperature at which the parts in question are to be maintained. In the case of metal casting moulds, the moulds are provided with internal conduits, the cross-secional shape, length and distribution of which are suitably chosen and which are connected to the circuit of coolant liquid, the output of which is controlled.

Hitherto the control of the output has generally been effected by hand using taps or valves manipulated by "feel", always with a certain delay.

Moreover, casting techniques do not make use of the governor valve arrangements which were described in detail above because of the disadvantages mentioned. Experience has confirmed that their use does not give satisfactory results.

The present invention thus has an object a thermally controlled governor valve arrangement controlling the output of a fluid, all the components of which are contained within a single unit and which obviates or minimises all the disadvantages above-mentioned. This governor comprises a variable closure member located in a passage which may be open or closed and which normally connects an upper and a lower chamber connected in series to the fluid circuit the closure member being connected to a thermostatic control bellows and to and elastic member acting against the bellows, the elastic member being adjustably pretensioned.

According to the invention, a permanent auxiliary passage connects the upper and lower chambers so as to short-circuit the main passage, while the thermostatic control bellows is in thermal connection with the fluid circulating in one of the chambers.

According to an important feature of the invention, the diameter of the permanent passage may be adjusted by means of a threaded pin.

In an embodiment which is particularly applicable to a closed fluid circuit, the thermostatic control bellows, which contains an expansible fluid, is arranged in a compartment separated from the two chambers and is in communication with a heat exchanger in the upper chamber.

In addition, the upper chamber containing the heat exchanger and the compartment housing the thermostatic bellows are arranged coaxially and parallel to the lower chamber, the free end of the bellows being provided with a pushrod connected to the stem of a valve which constitutes the closure member by means of a lever which is mounted so as to be able to pivot about a fixed pin.

In a second embodiment which is particularly applicable to an open fluid circuit, the thermostatic control bellows is located in the lower chamber, the outlet aperture of which is of larger diameter than the maximum diameter of the smallest full section of the permanent passage and of the main passage.

The closure member is, moreover, constituted by a slide valve mounted so as to be able to slide while sealed within the body of the governor and defining a gap which is of such a shape as to be able to connect the upper and lower chambers in dependence upon the position of the slide valve.

The governor of the invention thus possesses the following advantages:

(a) Without a complicated arrangement (no probe) it is possible to receive instantaneous, true and accurate information as to the temperature in the upper regions. In fact, the reduced but permanent output of fluid maintained through the governor due to the provision of a free passage between the upper and lower chambers makes it possible always to maintain the temperature in the thermostatic bellows substantially equal to that in the circuit to be controlled, which would not be the case if there were no permanent output, since the variations in temperature would not then be transmitted to the thermostatic bellows other than by conduction through the fluid.

(b) Moreover, the time required for the regulating closure member to respond to the information received by the thermostatic bellows is practically zero.

(c) The governor of the invention may be used with any fluid at any pressure as long as it is possible to control the permanent output.

(d) The control effected by the closure member is not affected by the pressure of the fluid which passes through the governor. In fact, in the first embodiment of the invention, the thermostatic bellows is separated from the upper chamber and thus only controls the valve in dependence upon the temperature within the bellows or that transmitted to it by the heat exchanger. In the case of the second embodiment, the pressure in the lower chamber is maintained substantially equal to atmospheric pressure and the pressure of the fluid in the upper regions cannot therefore act upon the thermostatic bellows.

(e) The task of inserting the governor in a fluid circuit is simplified since all the components of the governor are combined in one unit.

(f) The design and production of the governor are simple and economic.

The present invention also extends to the particular application of the governor above defined to a circuit for the liquid used to cool metal casting moulds.

Various other features of the invention will become clear in the course of the following detailed description.

Figure 2:
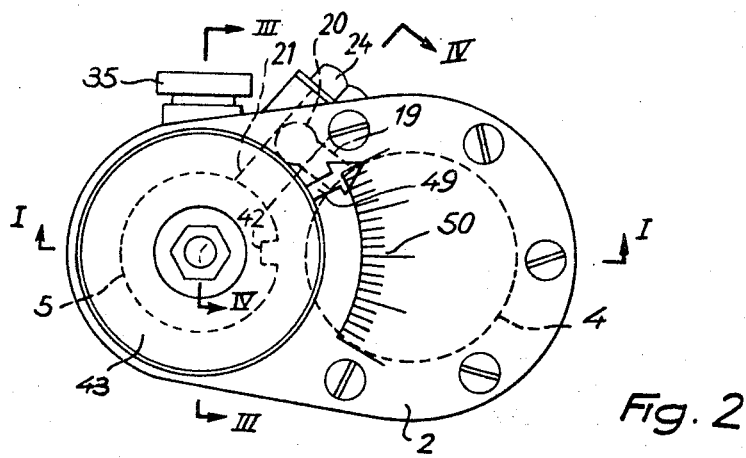
Figure 3:
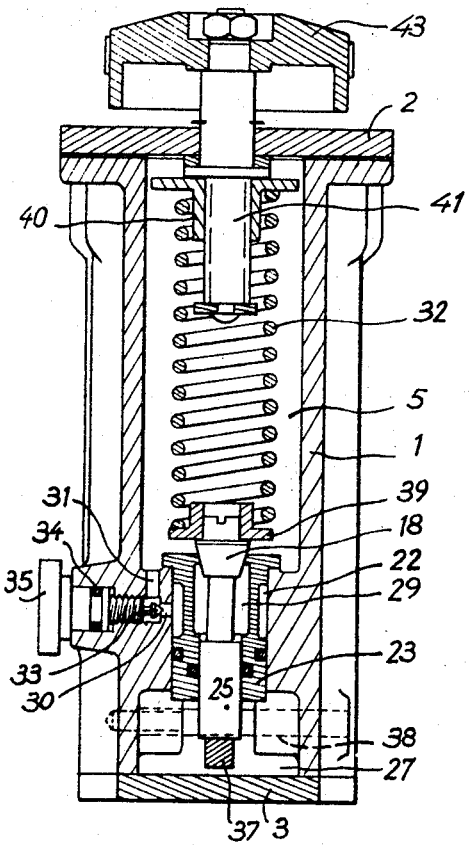
Figure 4:
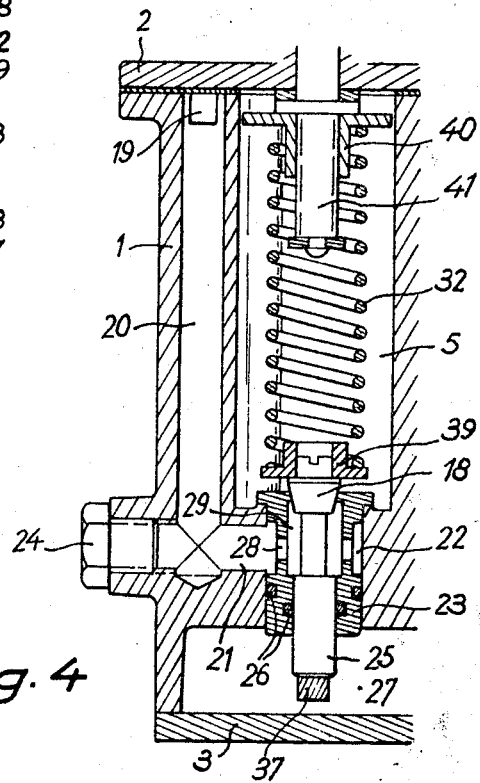
Figure 5:
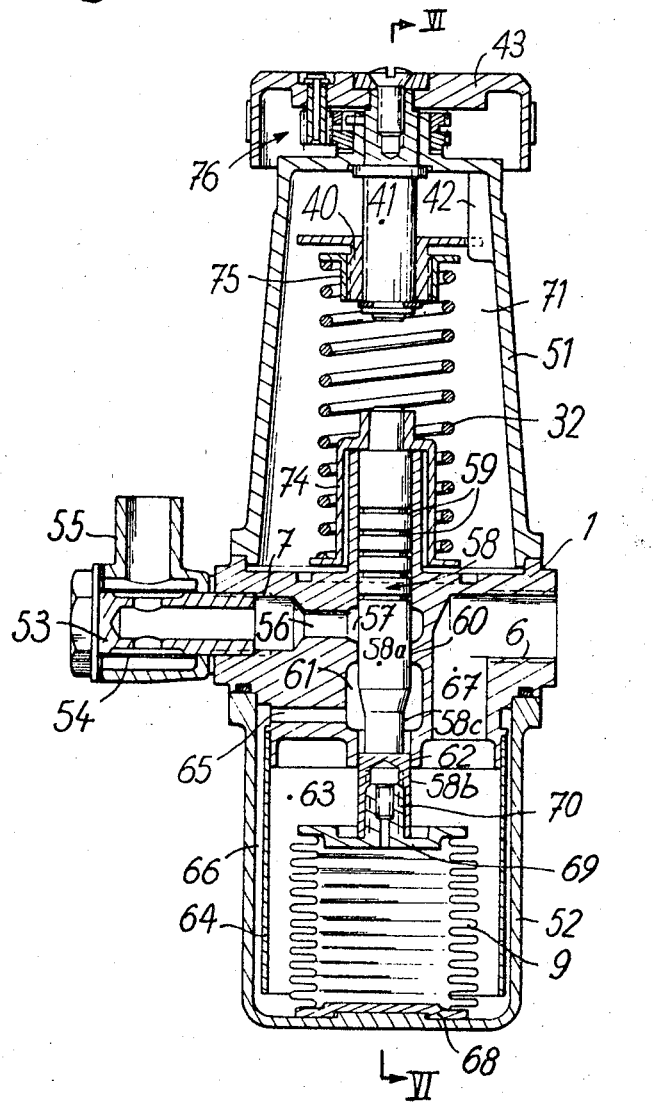
Figure 6:
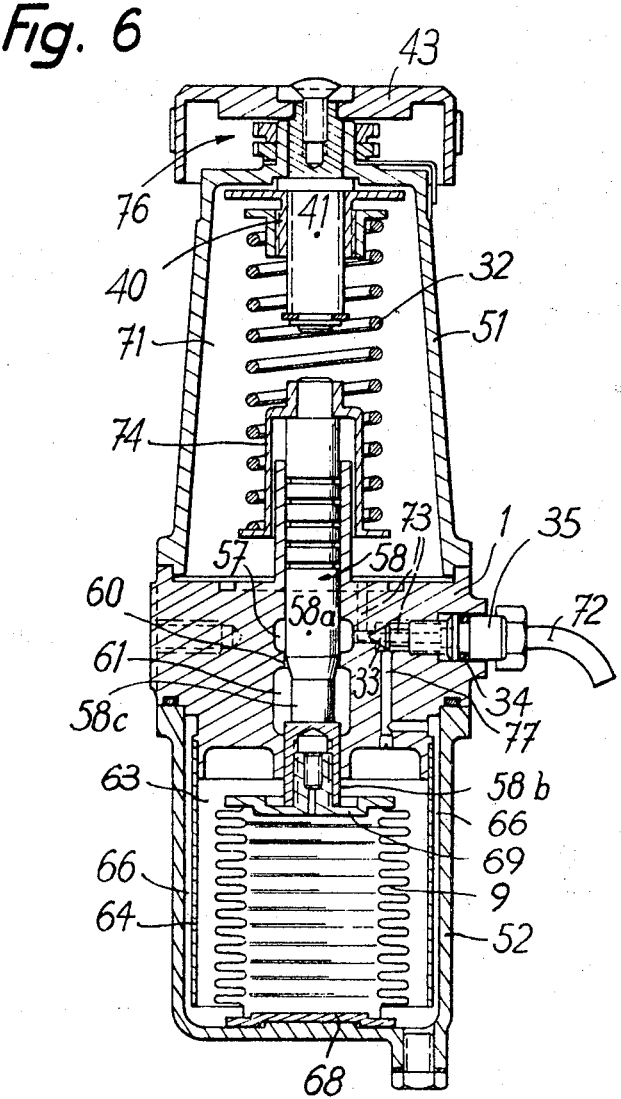

Embodiments of the object of the invention are shown by way of non-limiting example in the accompanying drawings, in which:

FIGURE 1 is an elevational view in axial section along the line I—I in FIGURE 2 of a first embodiment of the governor valve arrangement of the invention for use in a closed fluid circuit, FIGURE 2 is a plan view of the device shown in FIGURE 1, FIGURE 3 is a transverse section along the line III—III in FIGURE 2, FIGURE 4 is a view in partial section along the line IV—IV in FIGURE 2, FIGURE 5 is an elevational view in longitudinal section, similar to that of FIGURE 1, of a second embodiment of the governor for use in an open fluid circuit, and FIGURE 6 is a view in section along the line VI—VI in FIGURE 5.

In the first embodiment shown in FIGURES 1 to 4, the governor of the invention comprises a hollow body 1 closed at both ends by covers 2 and 3.

The body 1 defines an upper chamber 4, a lower chamber 5 and a compartment 6. The chambers 4 and 5 have their outlets adjacent the cover 2 but are normally obturated by the said cover. The chambers are also connected, through conduits 7 and 8, to the fluid circuit, the output of which is controlled as a function of the temperature in the upper regions. The fluid circulates in this circuit in the direction indicated by the arrow F.

The compartment 6 is normally cut off from the upper chamber 4 since it houses a thermostatic bellows 9 which must respond to the variations in the temperature of the fluid circulating through the governor but not to the variations in the pressure in the said fluid. The thermostatic bellows 9 is, therefore, in permanent communication with a heat exchanger 10 located in the upper chamber 4, the thermostatic bellows and heat exchanger containing a gas with a high coefficient of expansion.

In the particularly advantageous embodiment shown in FIGURES 1 to 4, the body 1 defines a recess closed at one end by a base 11 and open at its other end adjacent the cover 2. This recess has a cylindrical portion in which an intermediate plate 12 equipped with a flexible toroidal joint 13 may be fitted so as to be able to slide therein in a sealed manner.

The plate 12 cuts off the upper chamber 4 from the compartment 6. Furthermore, the said plate 12 is rigidly attached, by means of a coaxial rod 14, to an end plate 15 which is normally applied against and secured to the internal face of the cover 2. The heat exchanger 10 is then constituted by a tubular bellows with a thin, preferably metal wall, the ends of which bellows are secured by any suitable means to the intermediate plate 12 and end plate 15. The thermostatic bellows 9 is also secured by its ends to the intermediate plate 12 and to a second end plate 16 which is able to move freely in an axial direction. The internal chambers of the tubular bellows 10, which forms the heat exchanger, and of the tubular bellow 9, which forms the thermostatic member, intercommunicate by means of holes 17 perforated in the intermediate plate 12 and are filled with a gas having a high coefficient of expansion. It is thus clear that in this embodiment the heat exchanger and the thermostatic bellows constitute a separate, individually mounted unit which may be inserted in the body 1 of the governor so as to separate the upper chamber 4 from the compartment 6 therein.

According to the invention, the upper chamber 4 and the lower chamber 5 intercommunicate from time to time through a valve 18 controlled by the thermostatic bellows 9 and are permanently connected through a calibrated passage.

In the embodiment shown in FIGURES 2 to 4, a radial channel 19 is provided between the body 1 and the cover 2 which connects the upper chamber 4 to a vertical conduit 20 which is extended by a horizontal conduit 21 having its outlet in a peripheral chamber 22 provided between the body 1 and a sleeve 23. The conduits 20 and 21 are bored in the body and closed at one of their ends by the cover 2 and a stopper 24 respectively. In other words, the upper chamber 4 is permanently connected to the peripheral chamber 22.

In this embodiment the sleeve 23 inserted in the body forms a seating for the valve 18 and an axial guide element for the stem 25 of the valve, seals 26 being provided to prevent any leakage to a space 27 defined in the body 1 between the base 11 and the cover 3.

The peripheral chamber 22, through which there flows the fluid coming from the upper chamber 4, is connected through holes 28 in the sleeve 23 to a centre chamber 29 in the sleeve about the valve stem 25 (FIGURE 4), and through a hole 30 in the body 1, to a permanent passage 31 which has its outlet in the lower chamber 5 (FIGURE 3).

The flow of fluid from the upper chamber 4, through the centre chamber 29 towards the lower chamber 5 is intermittent and is controlled by the valve 18. To this end the said valve is acted upon so as to be urged in opposite directions (by means to be defined hereinafter) by the thermostatic bellows 9 and a helical spring 32, the pretension of which may be adjusted.

In contrast the flow of fluid from the upper chamber 4, through the peripheral chamber 22 towards the lower chamber 5 is continuous, the fluid passing through the passage 31. This permanent flow of fluid is, however, restricted and may easily be regulated by means of a threaded pin 33 which cooperated with the hole 30 (FIGURE 3). The threaded pin 33 is mounted in a threaded hole in the body 1 and is extended by a cylindrical portion provided with a seal 34 and actuating button 35.

The connection between the valve 16 and the thermostatic bellows 9 may be effected in various ways, one of which is by direct contact. In the embodiment shown, however, in which the axis of the lower chamber 5 is parallel to the axis common to the upper chamber 4 and the compartment 6, the free end plates 16 secured to the thermostatic bellows 9 is provided with a pushrod 36 guided in a boss in the base 11 of the body and projecting into the space 27, as does the free end of the stem 25 of the valve 18 (FIGURE 1). The pushrod 36 and stem 25 are then applied against the convex end portions of a lever 37 located in the space 27 and mounted so as to be pivotable at its centre about a fixed pin 38 of the body 1. Consequently, any extension of the thermostatic bellows 9 is transmitted through the pushrod 36 and lever 37 to the stem 25 so that the valve 18 is opened wider. Contraction of the thermostatic bellows has the opposite effect.

The spring 32 is inserted between a ring 39 with shoulders which is carried by the head of the valve 18 and the flange on a nut 40 cooperating with a screw 41. The flange of the said nut 40 has a recess which is threaded on a rib 42 on the body projecting into the lower chamber 5. This nut is thus free to move axially to translation but not to rotate. In contradistinction, the screw 41 is mounted so as to turn in the cover but to be secured in translation. By turning the said screw 41 by means of a milled button 43 on the outside of the governor to which the screw is secured, the nut 40 is urged to move in translation in an axial direction, thus compressing the spring 32 to a greater or lesser extent. A means is thus provided for regulating the initial tension of the spring, and consequently the force which acts on the valve 18 against that exerted by the thermostatic bellows 9. This means of controlling the initial tension of the spring 32, i.e., the screw 41 and nut 40, may be used without any other components being required, as is shown in FIGURE 3. It may, however, be advantageous to combine this mechanism with a device which simplifies readings and makes the adjustment achieved more accurate and reliable. This device, which is shown in FIGURES 1 and 2, may be composed of a planet pinion 44 mounted so as to be able to rotate idly about an eccentric pin 45 of the button 43 and meshing with a sun gear 46 keyed to a tubular boss 47 on the cover 2 and with a sun gear 48 able to rotate idly about the said boss. The latter sun gear 48 is in turn secured to an indicator 49 which moves over a calibrated dial 50. The epicyclic gear train thus formed enables a small angular movement of the indicator 49 on the calibrated dial 50 to represent a great rotation (which may be of several turns) of the button 43 and thus of the screw 41.

The governor of the invention in the embodiment shown in FIGURES 1 to 4 operates as follows:

When it is desired to regulate the temperature of a metal casting mould, the coolant fluid for the mould, which is heated therein, passes continuously through the governor, even when the valve 18 is closed, since the fluid is able to flow from the upper chamber 4 to the lower chamber 5 by passing through the channel 19, the conduits 20, 21, the peripheral chamber, hole 30 and passage 31. This continuous minimum flow can, of course, be adjusted by means of the threaded pin 33. In any case, the temperature of the fluid contained in the thermostatic bellows 9 is always equal to that of the fluid which passes through upper chamber 4 since heat exchange occurs through the thin wall of the heat exchanger 10. In other words, the temperature of the fluid in the thermostatic bellows 9 is substantially equal to that leaving the mould. If this temperature is too high with respect to that originally fixed by adjusting the button 43 controlling the initial tension of the spring 32, the thermostatic bellows 9 expands and by acting through the pushrod 36 on the pivotal lever 37, causes the valve 18 to open. The degree of aperture increases with the degree of expansion of the thermostatic bellows 9 as a result of a rise in temperature. On the other hand, if the temperature drops, the thermostatic bellows 9 contracts and the action of the spring 32 on the valve 18 is the greater so that the spring tends to urge the valve into the closed position. By opening the valve wider it is possible to increase the amount of fluid which passes through the governor and thus through the mould and conversely by closing the valve 18 the amount of such fluid is reduced. The arrangement of the invention thus regulates the temperature of the fluid passing through the mould only to ensure that this temperature is substantially equal to that which was preset by adjusting the tension of the spring 32.

In a modification, the permanent passage within the governor may be located between the valve 18 and its fixed seating 23. In one embodiment, an adjustable end stop member may be provided to prevent complete closure of the valve. For example, a screw may be located in the cover 3 and project into the compartment 27 adjacent the stem 25 of the valve. The corresponding end of the pivotal lever 37 may or may not be inserted between the stem 25 and the said screw. In another embodiment, grooves are provided in the valve 18 and/or its seating 23, so that the valve may be applied against its seating while permitting a permanent flow of fluid to continue to pass.

In the second embodiment shown in FIGURES 5 and 6, the body 1 contains an intake tube 7 in which is located a hollow bolt 53 provided with a tubular filter 54 and serving to secure a connection 55 normally connected by tubing to the outlet of the open circuit for the fluid to be controlled. A conduit 56 is provided in the body 1, in order to connect the intake conduit 7 and an upper annular chamber 57. This upper chamber encloses a cylindrical slide valve 58 which is able to slide in a sealed manner in the body owing to accurate adjustment and to the provision of grooves 59.

This slide valve 58 has two cylindrical bearing portions 58a and 58b of equal diameter and separated by a suitably shaped clearance 58c. The bearing portion 58a of the slide valve may move into the bore 60 and cut off the upper chamber 57 from an intermediate chamber 61 which encloses the said slide valve. These two chambers 57 and 61 may be connected together through a main passage provided in the bore 60 by the clearance 58c of the slide valve when the valve slides into the upper chamber 57. The bearing portion 58b of the slide valve closes the bore 62 in the body, whatever the position of the slide valve, and thus prevents any direct communication between the intermediate chamber 61 and the lower chamber 63 defined in the cup 52 by a tubular skirt 64 located on the body. In fact, the intermediate chamber 61 and the lower chamber 63 are in permanent communication through a high-loss circuit which comprises radial conduits 65 bored in the body 1 to connect the intermediate chamber 61 to a tubular conduit 66 defined by the skirt 64 and the cup 52, the said conduit 66 opening into the lower chamber 63 at its lower end. Into the upper part of this chamber there also discharges another outlet conduit 67 provided in the body 1 and terminating in a tube 6 provided to connect a conduit for connecting the lower chamber 63 with the location at which the coolant fluid is to be ejected.

Since the diameter of the outlet conduit 67 is much greater than that of the inlet conduit 56, and since a high-loss circuit is inserted between the intermediate chamber 61 and the lower chamber 63, the pressure in the said lower chamber must always be substantially equal to atmospheric pressure. This fact is very important since the governor is only provided with one thermostatic bellows 9 which, because it is the only one and is not connected to any compensating device, must not be permitted to be influenced by the pressure of the fluid to be controlled, but only by its temperature. The pressure in the lower chamber 63 is thus kept substantially equal to atmospheric pressure and it is therefore possible to locate the thermostatic bellows 9 within the said lower chamber. This bellows comprises a tubular sheath with annular folds and is sealed closed by means of a lower disc 68 which is applied against the base of the cup 52 and by means of an upper plate 69 provided with a threaded ferrule 70 which is screwed and jammed in the appropriate free end of the slide valve 58.

As is shown in FIGURES 5 and 6, the thermostatic bellows 9 is arranged coaxially to the regulating slide valve 58. The same is the case of the spring 32 which is provided to act against the force exerted by the thermostatic bellows 9. The initial tension of the spring 32 should be adjustable so that it is possible accurately to determine the temperature threshold at which the bellows 9 begins to effect control.

The spring 32 is located in a compartment 71 defined by the cap 51 and thus cut off from the chambers and conduits in which the fluid which is to be controlled is circulating. The spring is thus no longer in a hot, liquid medium and is consequently less liable to deteriorate. In the improbable event of a leak, the liquid penetrating the compartment 71 could be removed through a tube 72 with an external outlet which is connected to the said compartment by conduits 73 bored in the body 1. In any case the spring 32 is inserted between the flange of a sleeve 74 centered on and applied against the upper end of the slide valve 58 and a shouldered ring 75 adjustably secured to the nut 40 of the device for adjusting the tension of the spring. As in the first embodiment, this regulating device comprises the screw 40 which is fixed against rotation and driven in translation by means of a rib 42 on the cap 51, and a co-operating screw 41 driven in rotation and secured against translation. The milled control button 43 secured to the screw 41 may also, as in the first embodiment, be combined with a device 76 which facilitates readings and ensures the greater accuracy and reliability of the control achieved.

The governor of the invention thus comprises a passage which may be open or closed and is controlled by the slide valve 58 which is urged in opposite directions by the thermostatic bellows 9 and the spring 32 arranged coaxially to each other, the said main passage which may be open or closed being located between an inlet conduit 56 and an outlet conduit 67 of larger diameter, and also through a high-loss circuit so that the pressure in the lower chamber 63, which contains the thermostatic bellows 9, is always substantially equal to atmospheric pressure.

The governor of the invention also comprises a permanent passage 77 of adjustable diameter which serves to maintain a constant flow of fluid about the thermostatic bellows. However, this permanent passage 77 is so designed that it does not produce an increase of pressure in the lower chamber 63 in that it is composed of a number of conduits bored in the body 1 and connecting the upper chamber 57 with the peripheral conduit 66. The threaded pin 33 to 35 which serves to adjust the diameter of the permanent passage 77 is then arranged in the body 1 so as to terminate in the angle formed by two of the conduits of this permanent passage.

This second embodiment has the advantage of rendering the governor much more sensitive. In fact, the closure member is only acted upon by the forces which cause it to move, i.e. the opposing forces exerted by the counter-spring and the thermostatic bellows, the parasitic secondary forces which in the first embodiment had been due to friction of the stem on the seal and to the presence of a mechanical transmission, etc. being practically eliminated. The slide valve is thus perfectly free to move and consequently the slightest fluctuation in the temperature of the fluid causes the force exerted by the bellows to vary and results in a corresponding movement of the slide valve.

A further particularly important advantage of this second embodiment is the improvement obtained as regards simplicity of design and operation, as well as in price.

The invention is not limited to the embodiments shown in the drawing and described in detail. Various modifications may be made thereto without departing from the scope of the invention as defined by the appended claims.

I claim:

1. A governor valve for controlling the rate of flow of a fluid so that it is a function only of the temperature of the fluid, comprising a body; a main passage in said body; a valve member movable in said main passage between closed and opened positions to allow fluid to flow therethrough; two chambers, one situated upstream of said main passage and the other situated downstream of said main passage; stem means for connecting said closure member to a thermostatic control bellows which contains an expansible fluid and is adapted to directly contact the fluid flowing in one of the chambers so as to control the movement of said valve member; an adjustable counter-spring acting against said bellows, said counter-spring being adjustable by means of a screw and nut mechanism to accurately control the opening of said closure member, said mechanism comprising a hand wheel for turning a rotary element of said mechanism, an epicyclic gear train connecting said hand wheel to an indicator member which moves over a calibrated dial; said gear train comprising at least one planet pinion mounted so as to be idly rotatable abount an orbital axis of said hand wheel and meshing with two sun gears, one of which is fixed with respect to the body of the governor while the other is free and carries said indicator member; and an auxiliary passage having means for adjusting the area thereof and maintaining the upper and lower chambers in permanent communication to by-pass said main passage; said bellows being positioned in a chamber which has a substantially constant fluid pressure close to that of atmospheric pressure and wherein the bellows is unaffected by the fluid flowing therethrough.

2. The governor valve of claim 1 in combination with a closed fluid circuit, wherein said thermostatic control bellows contains an expansible fluid, is located in a compartment separated from said two chambers and is in communication with a heat exchanger in said upstream chamber.

3. The governor valve of claim 2, wherein said upstream chamber containing the heat exchanger and the compartment housing the thermostatic bellows are arranged coaxially and parallel to said downstream chamber, the free end of said bellows being provided with a pushrod connected to the stem of said valve member by means of a lever which is mounted so as to be able to pivot about a fixed pin.

4. The governor valve of claim 3, wherein said heat exchanger comprises a tubular bellows secured to two end plates rigidly connected to one another by means of a coaxial rod, the first plate of said two end plates being secured to the lower side of the cover on said body while the second plate of said two end plates is perforated and is slideably engaged within a bore in the said body so as to seal said upstream chamber from the compartment, said thermostatic bellows being secured at one end to said second perforated plate and the other end to a third free plate attached to the pushrod which actuates the valve.

5. The governor valve of claim 2, wherein said valve member comprises a valve which is engageable with a valve seat formed in a sleeve inserted in the body of the governor and serving to guide the stem of the said valve, said sleeve defining, about said stem, a central chamber and within said body and about said sleeve, a peripheral chamber, the two chambers intercommunicating through holes, the peripheral chamber further being in permanent communication through a large diameter conduit provided in said body, to said upstream chamber and through the auxiliary passage, to said downstream chamber.

6. The governor valve of claim 2, wherein the auxiliary passage is provided between the valve member and a valve seat in the passage cooperating therewith, and is adjustable by means of a screw acting on the stem means.

7. A governor valve for controlling the rate of flow of a fluid so that it is a function only of the temperature of the fluid, comprising a body; a main passage in said body; a valve member movable in said passage between closed and opened positions to allow fluid to flow therethrough; two chambers, one situated upstream of said main passage and the other situated downstream of said main passage; said governor valve having only one thermostatic control bellows, said bellows being in said downstream chamber and containing an expansible fluid and being adapted to contact the fluid flowing in said downstream chamber, stem means connecting said valve member to said control bellows so that said control bellows controls the movement of said valve member; an adjustable biasing means acting against said bellows; and an auxiliary passage having means for adjusting the area thereof and maintaining the upper and lower chambers in permanent communication to by-pass said main passage, said downstream chamber having an outlet aperture of a larger cross-section than the maximum size of the smallest full section of the auxiliary passage and of the main passage; said downstream chamber having a substantially constant fluid pressure close to that of atmospheric pressure, said bellows being unaffected by the pressure of the fluid flowing through said downstream chamber.

8. The governor valve of claim 7, wherein said valve member is constituted by a slide valve mounted to slide in a sealed manner within the passage and provided with a clearance which is shaped to connect said upstream and downstream chambers in dependence upon the position of said slide valve.

9. The governor valve of claim 8, wherein the clearance of said slide valve controls the connection between said upstream chamber and an intermediate chamber connected to said downstream chamber through a highloss circuit, which circuit is composed of radial conduits and a tubular conduit enclosing the said downstream chamber.

10. The governor vlave of claim 9, wherein the permanent passage is located in the body of the governor between the said upstream chamber and said tubular conduit enclosing said downstream chamber.

11. The governor valve of claim 7, wherein the biasing means is located in a compartment in the body of the governor which is cut off from said chambers in which the fluid circulates.

References Cited

UNITED STATES PATENTS

| | | | |
|---|---|---|---|
| 1,850,963 | 3/1932 | Sponar | 236—93 |
| 2,300,899 | 11/1942 | Andersson | 236—93 |
| 2,463,599 | 3/1949 | Branson | 236—93 |
| 2,721,706 | 10/1955 | Schoerner | 237—8 |
| 1,472,412 | 10/1923 | Goosmann | 236—93 |
| 1,621,774 | 3/1927 | Fitzgerald | 236—93 X |
| 2,172,489 | 9/1939 | Young | 236—12 |
| 2,408,269 | 9/1946 | Peterson | 236—93 X |
| 2,461,136 | 2/1949 | Bornquist | 236—93 |

WILLIAM E. WAYNER, *Primary Examiner.*

U.S. Cl. X.R.

137—468, 556.6; 236—99